Aug. 30, 1949.  A. R. RANGABE  2,480,608
ELECTRONIC TUBE
Filed Jan. 28, 1946  5 Sheets-Sheet 1
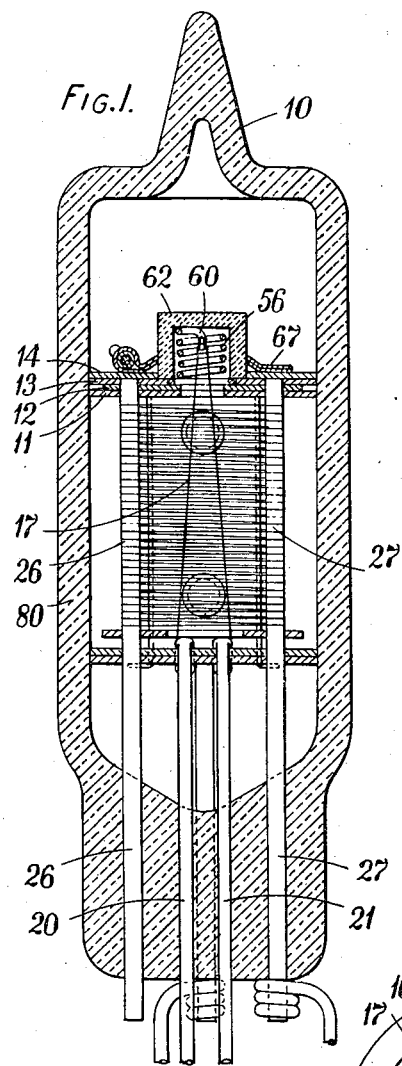
Fig.1.
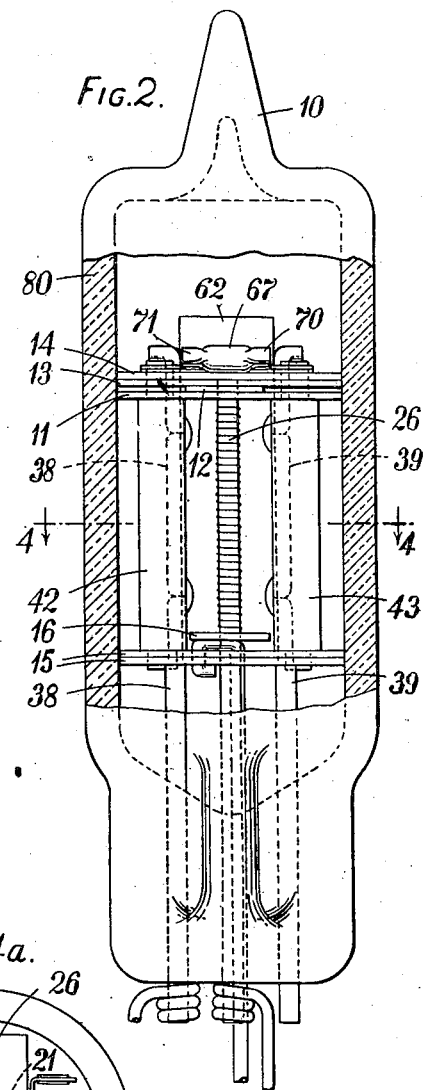
Fig.2.
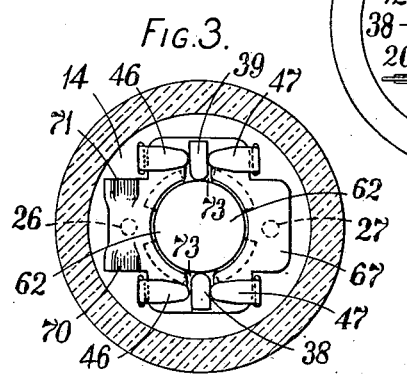
Fig.3.
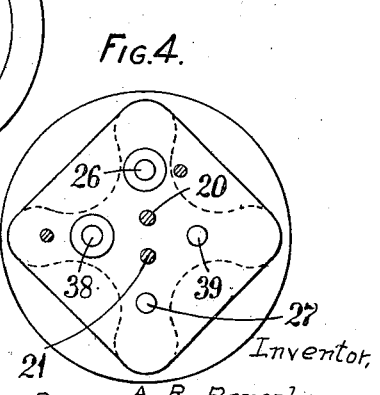
Fig.4a.
Fig.4.
Inventor,
A. R. Rangabe
By Young, Emery, Thompson Attys.

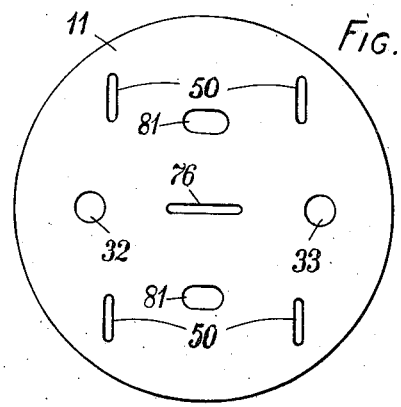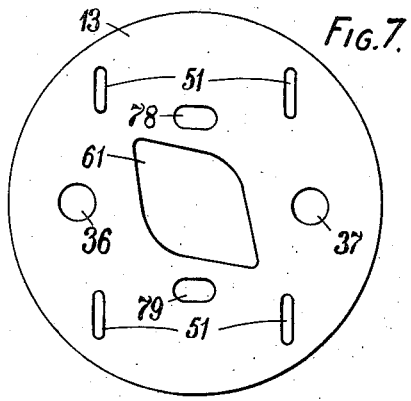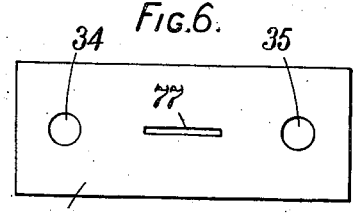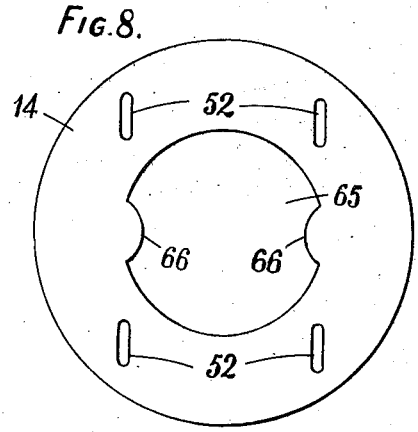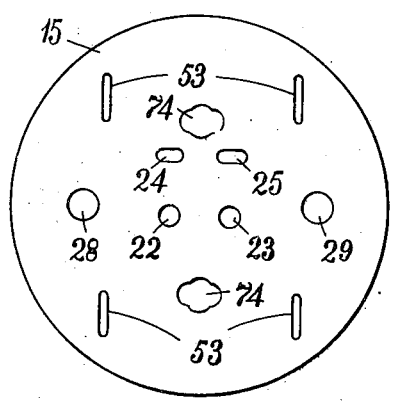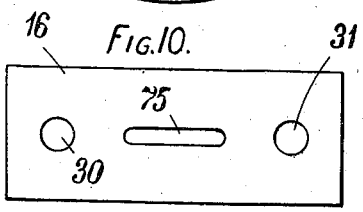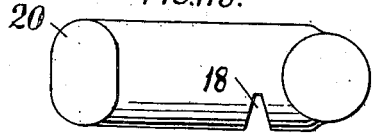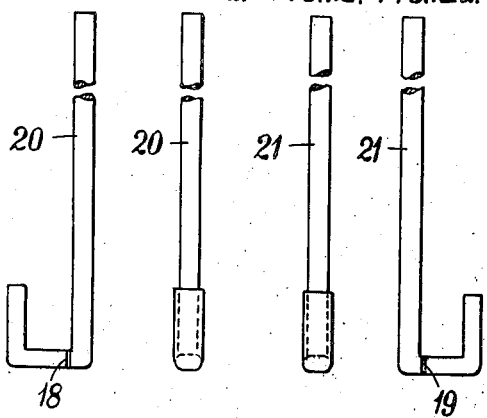

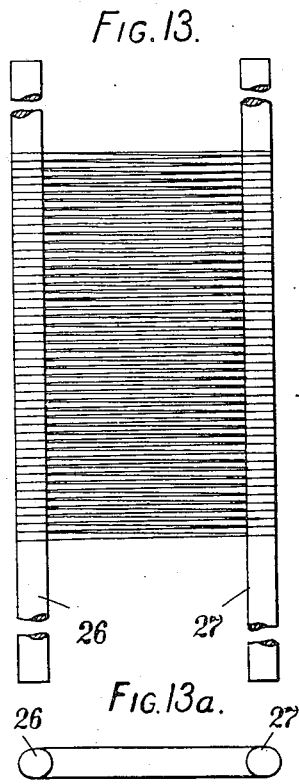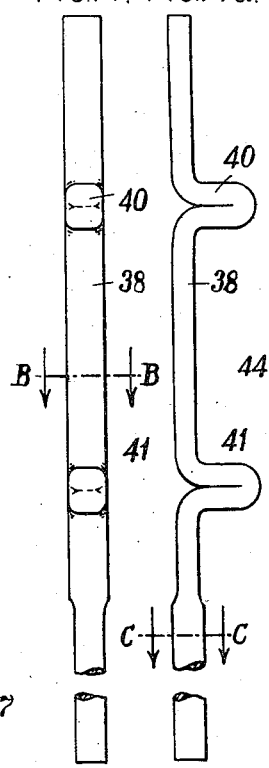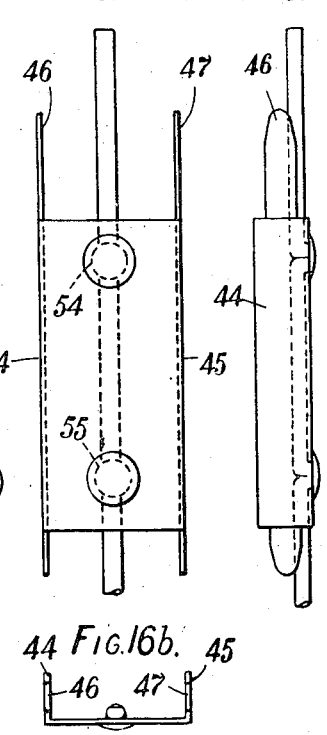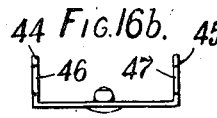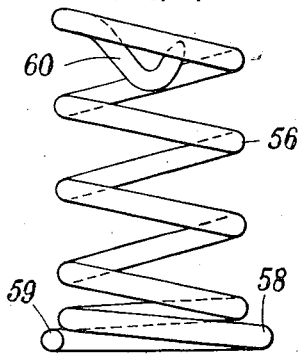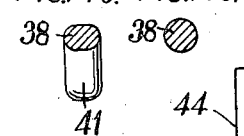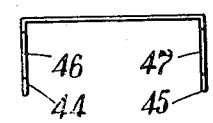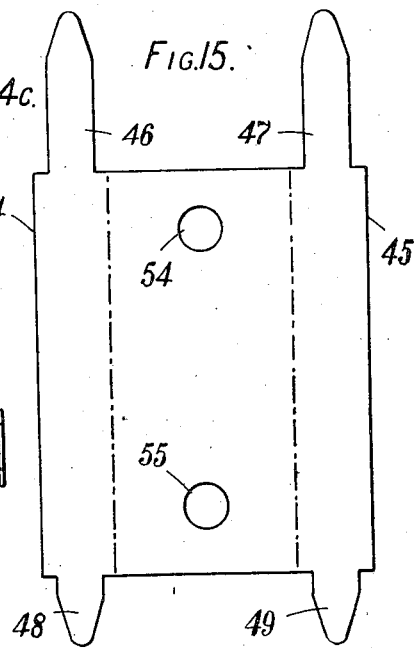

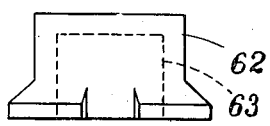
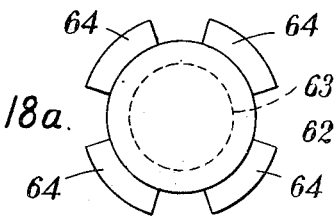
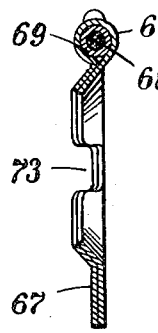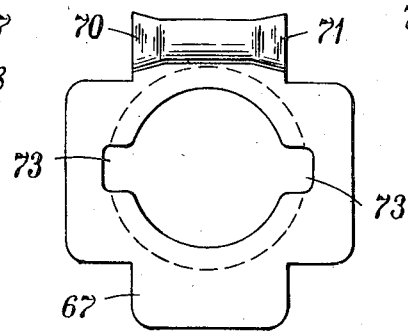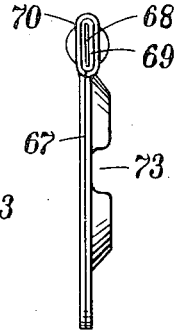
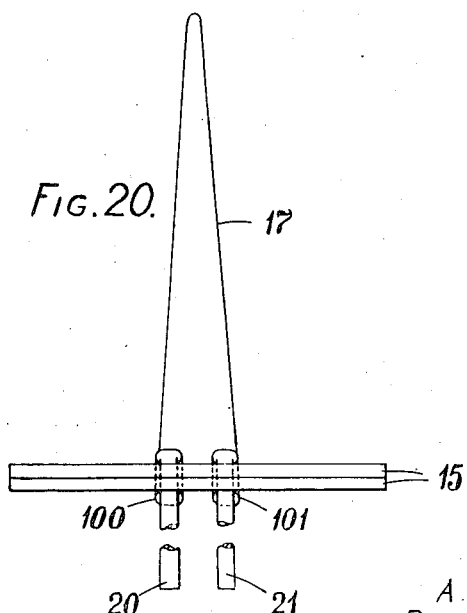

Aug. 30, 1949.  A. R. RANGABE  2,480,608
ELECTRONIC TUBE
Filed Jan. 28, 1946  5 Sheets-Sheet 5

Inventor,
A. R. Rangabe
By Young, Emery & Thompson
Attys.

Patented Aug. 30, 1949

2,480,608

UNITED STATES PATENT OFFICE 2,480,608

ELECTRONIC TUBE

Alexander R. Rangabe, Harrow-on-the-Hill, England, assignor to Hivac Limited, Harrow-on-the-Hill, England Application January 28, 1946, Serial No. 643,917
In Great Britain February 6, 1945

10 Claims. (Cl. 250—27.5)

The present invention concerns improvements in or relating to the manufacture of thermionic valves and is more particularly directed to the construction of very small valves, sometimes referred to as midget valves.

An object of the invention is to produce such a valve which is very rugged in construction and can be handled freely without any danger of its properties changing.

A further object is to provide a valve which can be manufactured in large quantities with a minimum of variation in the properties of different valves.

To attain this end the invention contemplates the incorporation of a number of distinct features some of which may have application in other types of valve construction.

Other features of the invention concern the mounting of filaments of thermionic valves or like apparatus according to which the filament is swaged or welded directly into nicks in the supporting wires, the formation of the anode of steel which will harden when cooled slowly and of a getter strip according to which a strip of metal is wound closely round a metallic sheathing including the getter material and the getter for individual lamps is stamped therefrom so that the main part of the strip serves as a heating element to enable the getter material to be evaporated efficiently.

One of the features of the invention concerns the employment of conducting wires having the same coefficient of expansion as glass which serve as supports for the electrode structure and at the same time extend through the glass envelope to form connecting tags thus eliminating the provision of two different kinds of metal and the provision of joints inside the envelope.

Another feature of the invention concerns the provision of laminar disc-like supports of which the laminations forming one support are differently apertured so that various effects may be obtained. One such effect is to locate the spring for supporting the filament. Another effect is to shield the ends of certain electrode supports positioned by one or more laminations by other laminations so as to prevent short circuits due to gettering. Another effect is to provide a narrow slit to confine the filament and limit its movement in the case of strain induced in transit.

Another feature of the invention is that the supporting helical spring for the filament is secured on the outside of two spaced insulating supports which serve to position the electrodes with respect to each other and is provided with a central hook support which supports the filament so that it is surrounded by the coils of the spring, which coils serve to restrict the emission of electrons therethrough.

The spring is thus under compression when the filament is taut.

Another feature of the invention concerns the provision of a getter in a part of the valve separated from the electrodes by an insulating disc extending across the envelope and of shielding means for the grid and filament including the supporting spring for the filament.

Yet a further feature of the invention concerns the provision of insulating means closely embracing the filament and its spring support to prevent any deformation thereof due to excessive strains induced in transit.

It will thus be appreciated that by the incorporation of the foregoing features in combination a very compact, rugged valve can be reproduced accurately in large numbers.

Referring to the drawings:

Figs. 1 and 2 illustrate front sectional and side elevations of a valve constructed in accordance with the invention.

Fig. 3 is a plan view looking from above,

Fig. 4 a plan view looking from below and Fig. 4a a section on the line 4—4 of Fig. 2.

Figs. 5, 6, 7 and 8 illustrate respectively the four components of the upper laminar mica support.

Fig. 9 illustrates each of the two discs which together with the plate illustrated in Fig. 10 form the lower laminar mica support.

Figs. 11, 11a and 11b show front, side and enlarged plan views of one filament tag and Figs. 12, 12a and 12b show similar views of the complementary filament tag.

Figs. 13 and 13a show front and plan views of the grid assembly.

Figs. 14 and 14a show front and side views of an anode tag, while Figs. 14b and 14c show cross-sections on the lines BB and CC respectively.

Fig. 15 shows a blank from which the parts of the anode are formed and Fig. 15a shows the shape after the first bending operation to form the anode.

Figs. 16, 16a, 16b show an anode sub-assembly, forming one half of the anode, in front, side and plan views respectively.

Figs. 17 and 17a show the spring supporting the filament in elevation and plan respectively.

Figs. 18 and 18a show the insulating cover for the spring in elevation and plan respectively.

Figs. 19, 19a and 19b show the getter plate in plan, cross-sectional and end views respectively.

Fig. 20 shows the filament sub-assembly.

Figure 21:
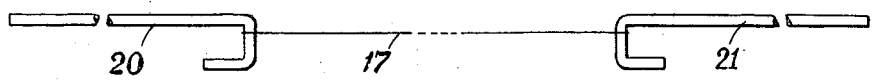

Fig. 21 illustrates the layout of filament tags to enable the filament to be secured thereto.

Figure 22:
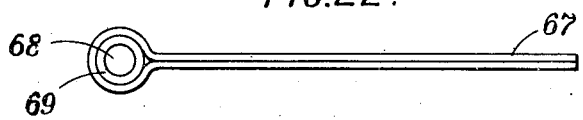
Figure 22A:
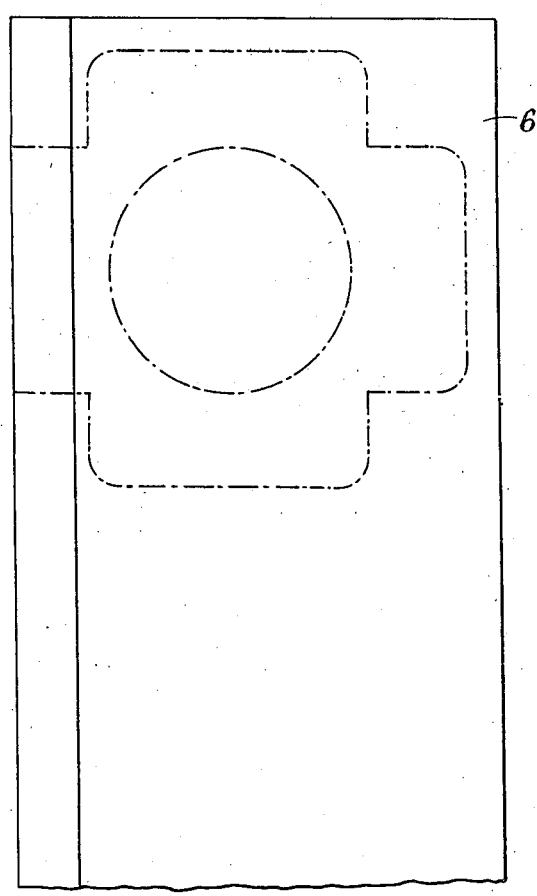

Figs. 22 and 22a illustrate the strip of metal folded round the metallic sheathing in plan and section from which the getter is formed.

The drawings relate to a midget type valve in which the distance between the mica supports, that is to say, the length of the anode, equals 8 mm. Other dimensions are shown in proportion.

Referring to Figs. 1 and 2, the envelope 10 is formed from a glass tube which is drawn out at the upper end to enable the valve to be evacuated and sealed in known manner and is pinched at the other end in a cruciform manner.

The electrodes, in this case three in number, are supported between laminar mica supports. The upper mica support comprises 4 laminations, namely disc 11, plate 12 and discs 13 and 14, which are illustrated respectively in Figs. 5, 6, 7 and 8. The lower mica support comprises 3 laminations, namely two discs 15 and plate 16 which are illustrated respectively in Figs. 9 and 10. The filament 17 is mounted by swaging its ends in V-shaped nicks 18 and 19 in two complementary tags 20 and 21 illustrated respectively in Figs. 11, 11a and 11b, and 12, 12a and 12b. The tags are formed of copper-clad nickel-iron wire or like metal which has a similar coefficient of expansion of heat to glass. It will be noted that each filament tage has an end bent twice at right angles while the main portion is circular in section. The bent end is deformed before bending into an oval shape which allows for the V-shaped nick without unduly weakening the strength of the tag. The bending of the ends is effected to exact dimensions, the spacing being such that the main stems fit neatly in the circular holes 22 and 23 of the mica discs 15 (Fig. 10) and the parallel portions of the bent end fit accurately into the oval holes 24 and 25. Moreover the intermediate portions of the tags are flat and at right angles to both the main stem and the end portion so that when the tags are pushed home the intermediate portion rests along its length on the surface of a mica disc 15. In this way the spacing between the two filament tags 20 and 21 is accurately determined. The filament wire 17 is secured in the nicks 18 and 19 by swaging or like means. For this purpose the two complementary tags are spaced apart an accurately determined distance in a jig with the nicks 18 and 19 in a straight line (see Fig. 21). The filament wire is stretched so as to lie at the bottom of the nicks along the straight line and is secured in position by swaging the sides of the nick on to the wire and thereby forming a clamping of the wire with a good electrical contact.

The grid tags 26, 27 (Figs. 13 and 13a) which are formed of similar material to the filament tags are slightly oval in section and extend beyond the length of the main stem of the filament by an amount sufficient to just pass through part but not all of the laminations of the upper mica support.

These tags pass through holes 28 and 29 in mica disc 15 (Fig. 9), 30 and 31 in mica plate 16 (Fig. 10), 32 and 33 in mica disc 11 (Fig. 5), 34 and 35 in mica plate 12 (Fig. 6), and 36 and 37 in mica disc 13 (Fig. 7), but they do not pass through mica disc 14 (Fig. 12) which plate effectively covers up the ends and protects them from getter deposits. It will be appreciated that by means of the holes in the various mica plates and discs the grid tags are accurately spaced apart. The grid assembly is illustrated in Figs. 13 and 13a and consists of winding in known manner a fine wire of given length and dimensions round the two rods of a given pitch and for a distance approximating to the distance between plate 16 and disc 11.

The anode tags 38, 39 are also formed of similar material to the filament tags. These are each formed as illustrated in Figs. 14, 14a, 14b and 14c and serve as supports and strengtheners for the anodes.

These tags are normally circular in section but are flattened somewhat at their upper ends and each deformed so as to be bent over on itself in two places at a predetermined distance apart and a predetermined distance from the upper end to form two protuberances 40 and 41.

The anode proper consists of two similar parts 42 and 43, each of which is formed from a blank of steel which is of such a nature as to harden on air cooling, that is to say it will harden at a slow rate of cooling. A suitable material is a ferrochrome steel, for instance a steel employing 16% of chromium and 1% of manganese has been found to give satisfactory results. Such a blank is illustrated in Fig. 15, which is subsequently bent into the form shown in plan in Fig. 15a, the wing portions 44 and 45 having projections 46 and 47 at the upper end and projections 48 and 49 at the lower end. The distance between the two horizontal ends of the body of the blank is equal to the distance between the upper mica disc 15 and the mica disc 11. Projections such as 46 and 47 pass neatly through the holes 50 in mica disc 11 (Fig. 5), 51 in mica disc 13 (Fig. 7) and 52 in mica disc 14 (Fig. 8) while projections such as 48 and 49 pass neatly through the holes 53 in the two mica discs 15 (Fig. 9).

Before the anode plates are placed in position between the main discs they are secured to the anode tags. The projections 40 and 41 are caused to enter the holes 54, 55 (Fig. 15) from the inside of the anode plates and are hot riveted over at the outside so as to rigidly secure the plates to the tags so that the anode sub-assembly takes the form illustrated in Figs. 16, 16a, 16b.

The spring 56 supporting the filament is so constructed, shaped and supported as to support the filament centrally and be capable of being accurately reproduced. It must be formed of a predetermined length of wire and must have constant characteristics supporting the filament from the correct angular position.

The construction of the spring 56 is illustrated in enlarged view in Figs. 17 and 17a and is formed by coiling a wire by rotation on a former to a given pitch. At the base, the wire is shaped to form two sides 57 and 58 and a predetermined part 59 of a third side of an equal-sided parallelogram allowing for suitable curvature at the corners and a slight rise where the convolutions start. The upper end 60 of the spring is bent radially inwards and downwards to form a hook having the lowest point of the cup of the hook exactly on the axis of the spring. It is important that the end of the part 59 should be an exact angular relationship to the hook end 60. The shape of the base of the spring is such as to fit neatly into the hole 61 in the disc 13 (Fig. 7) for a purpose to be described later, the central point of the hole 61 corresponding will the centre of the disc 13 and the axis of the spring 56.

The insulating cover 62 for the spring 56 is illustrated in enlarged form in Figs. 18 and 18a. This insulating cover has a hollow cylindrical interior 63 open at the lower side which has a diameter very slightly greater than the diameter of the spring 56 when supporting the filament so as to restrict any possible movement of the spring due to vibratory or other disturbances and prevent thereby any permanent deformation of the spring 56. The cover has a flat closed top and is enlarged at the base having four-arc-shaped projections 64 and is ground on its underneath surface. The projections 64 are bevelled on their upper sides as shown. The spaces between the projections are such as to enable the cover 62 to pass through the hole 64 in mica disc 14 (Fig. 8) and rest on the surface of the mica disc 13 (Fig. 7) while the projections 66 in disc 14 (Fig. 8) serve to locate the cover accurately.

The getter plate is illustrated in Figs. 19, 19a and 19b. This is formed from a stamping from a nickel strip as illustrated in Figs. 22 and 22a in which the strip closely embraces and is seam-welded round the usual getter material consisting of nickel-clad barium wire.

The portion of the strip corresponding to the part embracing the nickel clad barium wire as shown at 67, 68 represents the nickel with which the barium wire is clad. The barium-clad nickel wire is not only cut away short with respect to the width of the black ink but the stamping tool is designed to bevel or chamfer the ends as shown at 70 and 71. This has the effect of reducing the thickness of the nickel and extending it over the ends to substantially cover the barium and prevent it oxidising and at the same time it permits of a wider area for escape of the getter material when vaporised, thus ensuring the gettering taking place earlier and more reliably and uniformly than would be the case if the walls were left normal and the barium confined with an appreciable thickness of barium oxide.

The strip proper is as shown in Fig. 19 with a central hole the edges of which are slightly dished so as to permit the getter plate to pass over the insulating cover 62 (Fig. 18 and Figs. 1 and 2) and rest on the upper bevelled surface of the projections 64. The cut-away portions at the corners of the getter plate serve to allow the getter plate to rest on the disc 14 (Fig. 8) clear of the holes 52 and the projections of the anode plates. The getter material when in position on disc 14 lies to the left of the left-hand holes 52 so that the projection of the anode plate may be pressed over on to the getter plate without touching the getter material.

The recesses 73 in the inner part of the getter plate are such as to enable the anode tags to pass therethrough so that they also can be pressed over on to the getter plate.

To assemble the electrodes, it will be assumed that the filament 17 has been secured to the filament tags 20, 21 and that the filament tags have been secured in two discs 15 with the main stems in holes 22 and 23 and the legs in holes 24 and 25 and that the ends of the legs have been riveted over so as to form a filament sub-assembly as illustrated in Fig. 20.

It will also be assumed that the grid has been formed as illustrated in Fig. 13 and that two anode sub-assemblies have been formed corresponding to that illustrated in Fig. 16. The grid tags 26 and 27 are first passed through holes 30 and 31 in plate 16 (Fig. 10) and through the holes 28 and 29 of the plates 15 of Fig. 20 from the filament side, the filament being drawn up between the grid turns by a suitable tool while the anode tags are passed through the holes 74 (Fig. 9) with the projections 48, 49 passing through holes 53. In this way it will be seen that the anodes are arranged diametrically opposite to each other with their central portions parallel to the plane of the grid and the filament passing through hole 75 in plate 16 (Fig. 10). The disc 11 (Fig. 5) is next placed in position with the upper grid tags extending through holes 32 and 33, the filament being drawn through slit 76, the anode tags through holes 81 and the projections 46, 47 passing through holes 50. The plate 12 follows with the grid tags passing through holes 34 and 35 and the filament being drawn through slit 77. The plate 13 comes next with the grid tags through holes 36 and 37, the anode tags through holes 78 and 79 and the projections 48 and 49 through holes 51. The plate 14 comes next with the projections 46 and 47 through holes 52. The spring 56 is then placed with its base 57, 58, 59 in the hole 61 in which hole the base fits neatly so that the hook 60 on to which the filament is passed by compressing the spring appropriately supports the apex of the filament on the axis of the whole structure. Insulating cover 62 is then placed over the spring 56 and is located in a central position by lugs 66 engaging diametrically opposite recesses between projections 64. Last of all the getter plate is placed over the cover and by turning over the projections 46, 47, 48, 49 and the upper ends of the anode tags the electrode assembly is completed. The whole arrangement it will be appreciated is such that each electrode is in a definite and predetermined relationship to the other electrodes with a view to ensuring uniformity in manufacture.

The envelope 10 consists of a glass tube whose inner diameter is such that the mica discs are a neat fit therein. The base of the tube is heated and pinched on to the anode and grid tags in the form of a cross as shown in Fig. 4, the filament tags due to the thickness of the walls of the tube and of the glass at the centre of the cruciform pinch pass through the central portion and not the legs of the cross as do the grid and anode tags. The upper end of the tube serves for the exhaustion of the bulb which is then sealed up following normal practice.

I claim:

1. A rugged electronic tube constructed so as to have every element thereof supported so as to suffer no undue strain when subject to heavy external forces comprising an envelope, two spaced insulating supports forming a close fit in said envelope, a sheet metal anode formed of a metal which hardens at a comparatively slow rate of cooling and provided with prongs passing through holes in each of said insulating supports and bent over to secure the anode in position, said anode being hardened after being secured in position to increase its ruggedness, a stiff wire support for said anode extending through a pinch in the wall of said envelope and having sharply buckled portions spaced at suitable positions along its length which pass through holes in said anode and are riveted over to secure the anode rigidly to said support, a grid formed of wire wound round and swaged to two spaced stiff wire supports extending through a pinch in the wall of the envelope and anchored to both insulating supports, a filament swaged to stiff wire supports extending through a pinch in the wall of said envelope and passing through holes in and anchored to the nearest of said insulating supports and a helical spring secured centrally on the far side of the furtherest of the said insulating supports for supporting said filament under tension, the filament passing through the wires of said grid and holes in said last-mentioned insulating support which confine the possible movement of said filament within the limits of safety.

2. A tube according to claim 1 in which the anode is formed of ferro-chrome steel.

3. A tube according to claim 1 in which the anode is formed of steel containing 16% of chromium and 1% of manganese.

4. A rugged electronic tube constructed so as to have every element thereof supported so as to suffer no undue strain when subject to heavy external forces comprising an envelope, two spaced insulating supports forming a close fit in said envelope, a sheet metal anode formed in two parts of a metal which hardens at a comparatively slow rate of cooling, each part being provided with prongs which pass through holes in each of said insulating supports and are bent over whereby the two parts of the anode are secured in position facing each other, said anode being hardened after being secured in position to increase its rigidity, a stiff wire support for each part of said anode secured in opposite sides of a cruciform pinch in the wall of said envelope and having sharply buckled portions spaced at suitable positions along its length which pass through holes in the corresponding part of said anode and are riveted over to secure the parts of the anode rigidly to said supports, a grid located between the two parts of the anode and formed of wire wound round and secured to two spaced stiff wire supports secured in the other opposite sides of the pinch in the wall of the envelope and anchored to both insulating supports, and a filament swaged to stiff wire supports secured in the central portion of the cruciform pinch in the wall of said envelope and passing through holes in and anchored to the nearest of said insulating supports and a helical spring secured centrally on the far side of the furtherest of the said insulating supports for supporting said filament under tension, said filament passing through the wires of said grid and holes in said last-mentioned insulating support which confine the possible movement of said filament within the limits of safety.

5. A tube according to claim 4 in which the anode is formed of ferro-chrome steel.

6. A tube according to claim 4 in which the anode is formed of steel containing 16% chromium and 1% manganese.

7. In combination in a rugged electronic tube an electrode structure comprising a filament, a grid and an anode formed of sheet metal which hardens at a comparatively slow rate of cooling, an electrode structure comprising insulating supporting means for said filament, grid and anode, said anode having a bendable portion by which the anode is secured to said structure and hardened thereafter to increase its rigidity and a stiff wire support for said anode formed of a material having substantially the same coefficient of expansion as glass and extending some distance from the electrode structure to enable the extension to pass through a glass envelope and to be sealed therein.

8. In combination in a rugged electronic tube a mounting for a grid of a rugged electronic tube comprising two insulating supports, a grid formed of wire wound round and swaged to two spaced stiff wire supports formed of a material having the same coefficient of expansion as glass and secured to said insulating supports and extending beyond one of said supports, a filament swaged to stiff wire supports extending through a pinch in the wall of said envelope and passing through holes in and anchored to the nearest of said insulating supports and a helical spring secured centrally on the far side of the furtherest of the said insulating supports for supporting said filament under tension and passing through the wires of said grid and holes in said last-mentioned insulating supports which confine the possible movement of said filament within the limits of safety.

9. In a rugged valve a tubular glass envelope, a grid structure comprising two spaced insulating discs having a shape and size to fit neatly in said envelope, two wire rods formed of material having the same coefficient of expansion as glass secured in holes in each of said insulating discs and extending through and secured in a pinch in said envelope and wire extending in grid formation between said wire rods and secured thereto by welding.

10. A rugged valve comprising in combination a tubular glass envelope, spaced insulating discs fitting neatly in said envelope, two wire rods formed of material having substantially the same coefficient of expansion as glass secured in a pinch in the base of said envelope and secured to each of said insulating discs, anodes secured to said wire rods between said insulating discs, two additional wire rods also formed of material having substantially the same coefficient of expansion as glass, secured in a pinch in the base of said envelope and secured to each of said insulating discs, a grid structure formed of wire extending between and welded to said additional rods between said discs and between said anodes, and two further wire rods also formed of material having substantially the same coefficient of expansion as glass, secured in a pinch in the base of said envelope and secured to one only of said insulating discs, a filament secured to said further wire rods and passing through said grid structure and said anodes and extending through the other insulating disc and a spring mounted on the side of the insulating discs remote from the anode and grid having a central hook by which the filament is kept under tension.

ALEXANDER R. RANGABE.

REFERENCES CITED

The following references are of record in the file of this patent:

UNITED STATES PATENTS

| Number | Name | Date |
|---|---|---|
| 850,029 | Meeker | Apr. 9, 1907 |
| 1,463,860 | Wilson | Aug. 7, 1923 |
| 1,480,208 | Houskeeper | Jan. 8, 1924 |
| 2,087,327 | McNally | July 20, 1937 |
| 2,118,765 | Miller | May 24, 1938 |
| 2,167,852 | Rose | Aug. 1, 1930 |
| 2,219,574 | Fraenckel | Oct. 29, 1940 |
| 2,334,716 | Litton | Nov. 23, 1943 |

FOREIGN PATENTS

| Number | Country | Date |
|---|---|---|
| 482,909 | Great Britain | Apr. 7, 1938 |